July 4, 1950  W. DODGE  2,513,459
VEGETABLE PACKING MACHINERY
Filed July 27, 1946  8 Sheets-Sheet 1

INVENTOR.
WESLEY DODGE
BY
HIS ATTORNEY

FIG. 4

INVENTOR.
WESLEY DODGE

July 4, 1950 W. DODGE 2,513,459
VEGETABLE PACKING MACHINERY
Filed July 27, 1946 8 Sheets-Sheet 5

INVENTOR.
WESLEY DODGE
BY
Robert H. Eenoff
HIS ATTORNEY

July 4, 1950 W. DODGE 2,513,459
VEGETABLE PACKING MACHINERY
Filed July 27, 1946 8 Sheets-Sheet 6

INVENTOR.
WESLEY DODGE
BY
HIS ATTORNEY

July 4, 1950  W. DODGE  2,513,459
VEGETABLE PACKING MACHINERY

Filed July 27, 1946  8 Sheets-Sheet 7

INVENTOR.
WESLEY DODGE
BY *Robert H. Eckhoff*
HIS ATTORNEY

Patented July 4, 1950

2,513,459

UNITED STATES PATENT OFFICE 2,513,459

VEGETABLE PACKING MACHINERY

Wesley Dodge, Salinas, Calif.

Application July 27, 1946, Serial No. 686,651

4 Claims. (Cl. 93—5)

This invention relates to improvement in article packing machines, and particularly to a machine designed for wrapping articles of comparatively irregular size and shape, such as lettuce, cabbages, cauliflower, oranges, lemons, apples and like articles as well as articles in bulk such as fresh corn kernels, peas, beans, Brussels sprouts and the like.

Recent studies have indicated the desirability of preparing such articles for consumption and thereafter wrapping the prepared articles in a suitable wrapper, the operation being performed either at the point of shipment or at a distribution center geographically near to the point of final sale. The machine of the present invention is particularly suited to such an operation, operating rapidly and efficiently to place and secure a suitable wrapper about the prepared article.

It is generally the broad object of the present invention to provide a novel machine for the wrapping of head lettuce and the like.

The machine of the present invention includes an article delivery conveyor preferably advanced intermittently to deposit the articles to be wrapped at a wrapping station. To the wrapping station is delivered a wrapper sheet, e. g., vegetable parchment, cellophane or other suitable wrapping material. The wrapper sheet is derived from a roll of the material, being drawn into position at the wrapping station and then cut off from the roll, the operation being performed rapidly and quite accurately. At the wrapping station, the article is deposited upon the wrapper and the two are then forced downwardly through a suitable confining passageway to draw the wrapper up and around the article so that its ends are gathered together and extend above the article. The extending ends of the wrapper are then brought together into abutment and are secured together. In the form of machine disclosed, I have utilized a length of wire as a securing means, forming a staple of this and bending the staple about the abutting ends of the wrapper to secure these. The ends of the wrapper which project unevenly above the staple are then cut off evenly so that a neat appearing package is provided.

The invention will be particularly described as it has been practiced upon head lettuce. However, as has been set forth, other articles can be readily packaged.

The invention includes other objects and features of advantage, some of which, together with the foregoing, will appear hereinafter wherein the present preferred form of packaging machine of this invention is disclosed.

The construction of the present preferred form of the machine and its operation are as follows:

The conveyor and its movement

Referring to the drawings, the machine is supported on a suitable frame 1 made up of various suitable structural members joined together, the operating elements of the machine being partially covered by suitable guard plates 2 to protect an attendant.

Figures 1, 2, 3:
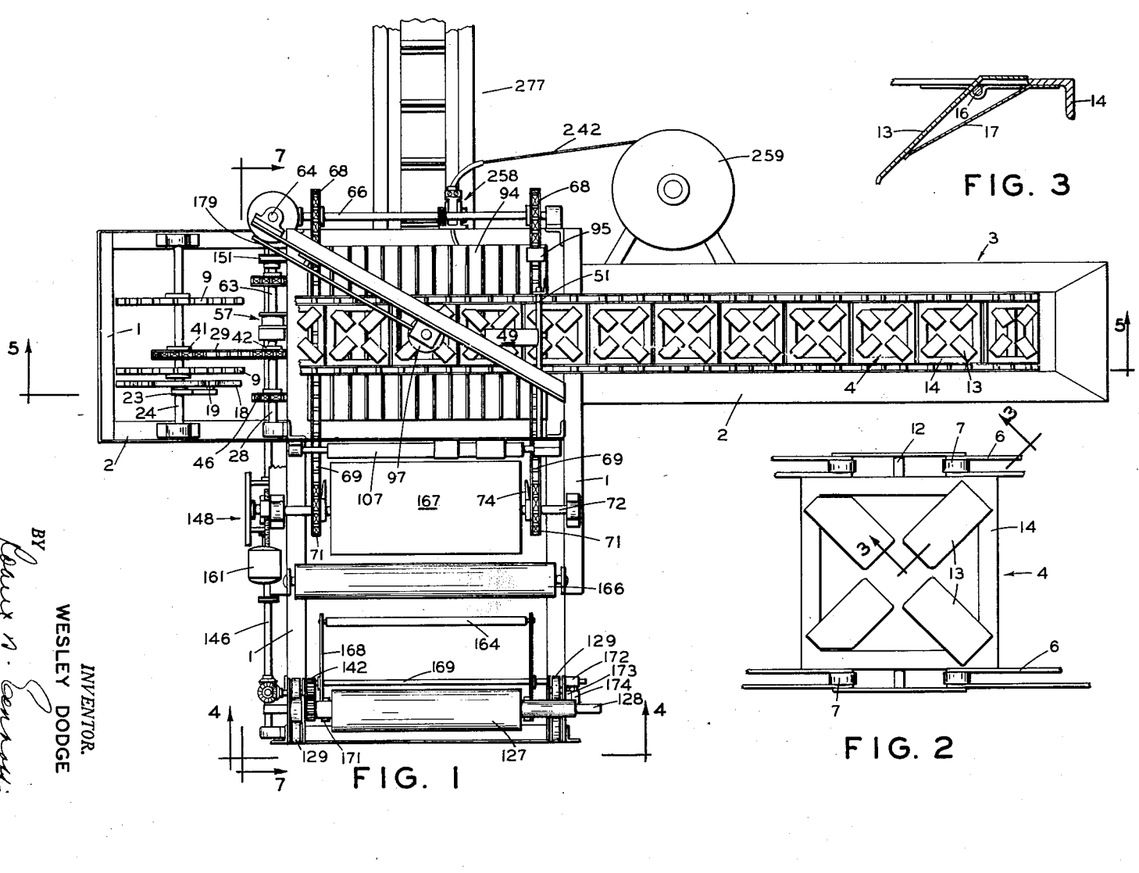
Figure 1 is a plan of the machine with portions broken away to illustrate the construction, the wrapper sheet being omitted.
Figure 2 is a plan view of an individual carrier element on the feed conveyor.
Figure 3 is a fragmental section on the line 3—3 through Figure 2 showing construction of an article carrier.
Figure 4:
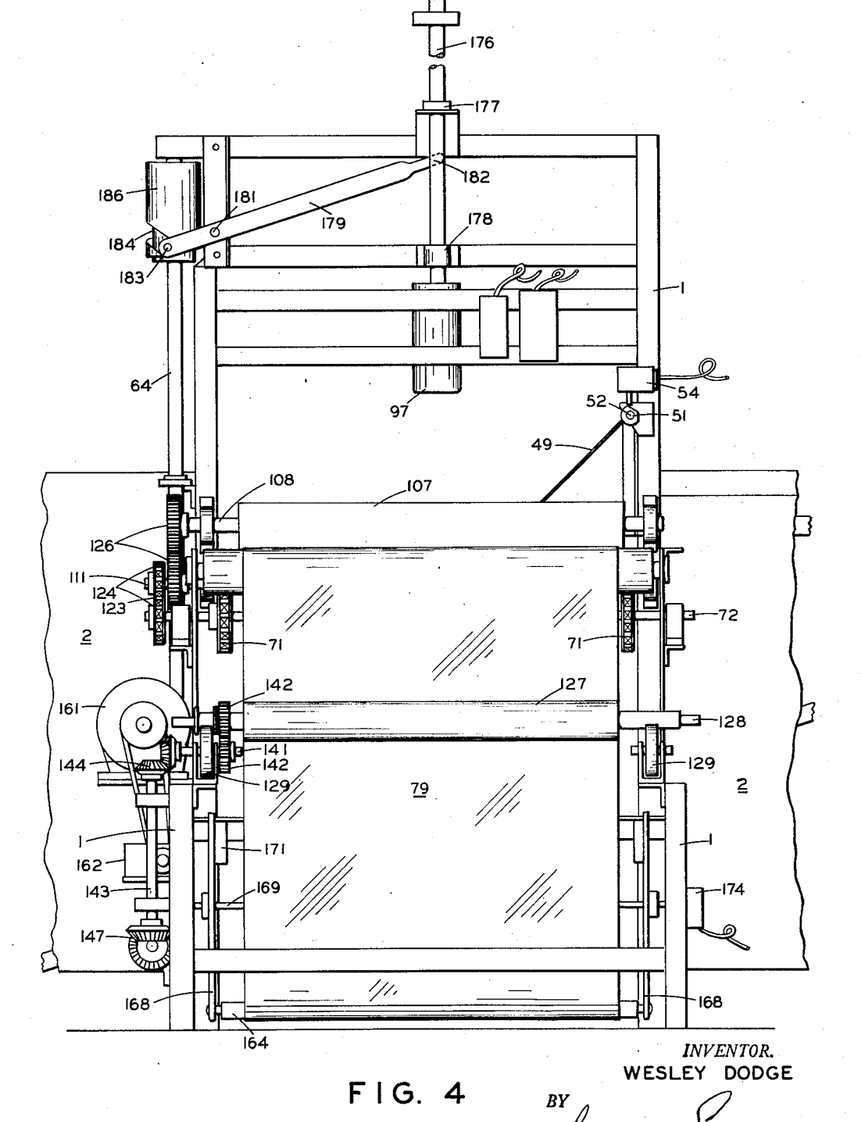
Figure 4 is an elevation along lines 4—4 of Figure 1.
Figures 5, 6:
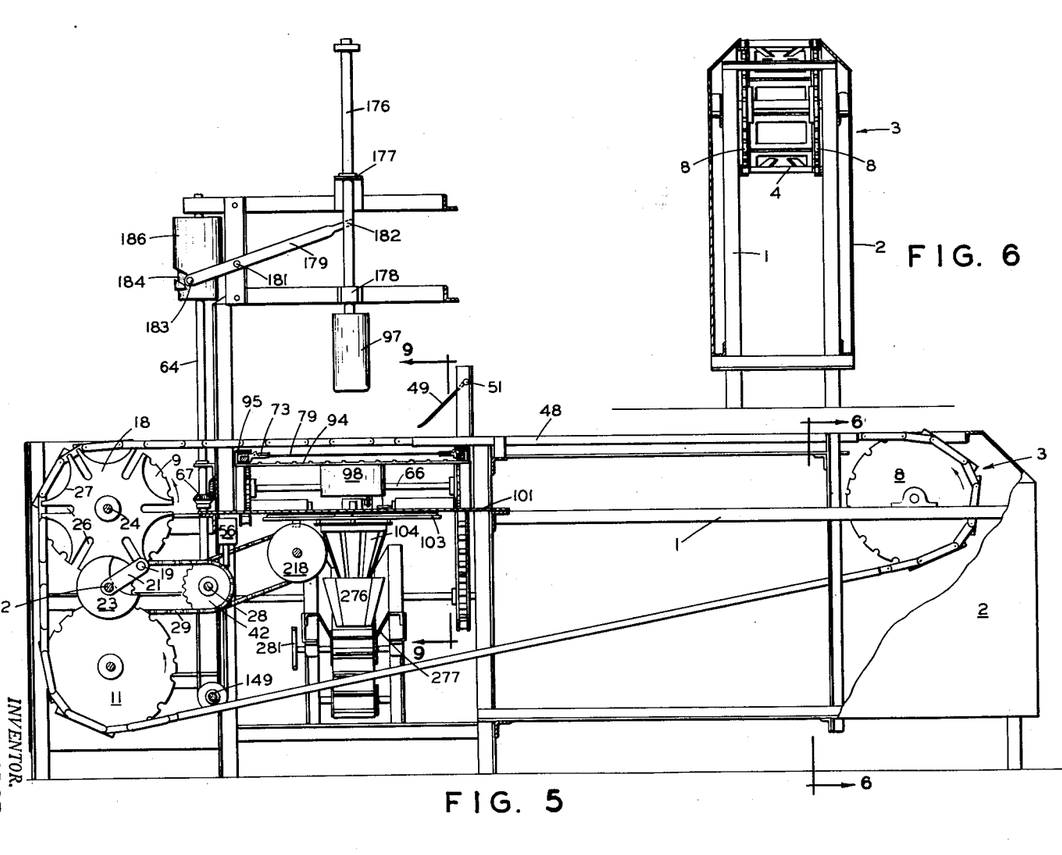
Figure 5 is a section along lines 5—5 of Figure 1.
Figure 6 is a section along lines 6—6 of Figure 5.

To convey articles into the machine, I provide a feed conveyor 3 having a plurality of separate article support elements 4. Each of the elements 4 is connected to the adjacent elements by links 6 between rollers 7 (Figure 2). Conveyor 3 rides over a path provided by sprockets 8, 9, and 11, being supported by angle irons 48 as it advances over the upper horizontal portion of its travel from sprocket 8 toward sprocket 9. The sprockets 8 and 9 are slotted to receive rollers 7 and pins 12 (Figure 5). Each article support element 4 includes four flaps 13, each hinged intermediate its ends to frame 14 by a pin 16 and supported by a spring strip 17 stiff enough to support that portion of the weight of the article thereon.

In the apparatus shown, conveyor 3 is moved step by step by a Geneva movement provided by a slotted wheel 18 driven by pin 19 on an arm 21 mounted on constantly rotated shaft 22 with circular segment 23. Wheel 18 and sprockets 9 are each fixed to shaft 24. Pin 19 engages slots 26 on wheel 18 to turn the wheel and move the conveyor forward step by step to advance the conveyor a predetermined distance. As pin 19 leaves slot 26, wheel 18 stops and circular segment 23 engages one of the circular recesses 27 on wheel 18 to locate and position the wheel to receive pin 19 in the next slot 26. Each revolution of arm 21 moves conveyor 3 forward the length of one of the article carriers 4 so that the article thereon can be deposited on a wrapper sheet, wrapped, and, when wrapped, discharged. Shaft 22 is driven from drive shaft 28 through chain 29 and sprockets 41 and 42. Drive shaft 28 is in turn driven by motor 43 through chain 44 and sprockets 46 and 47.

Feeding of the wrapping sheet

Figure 7:
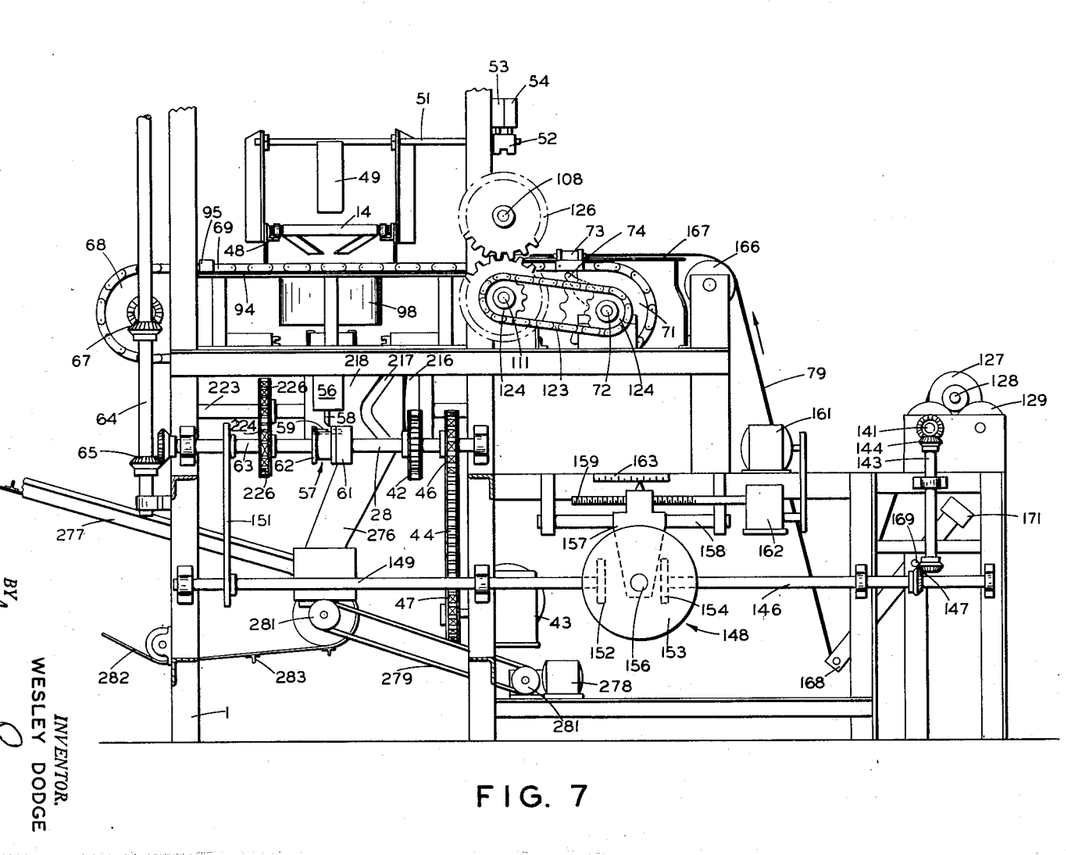
Figure 7 is a section along lines 7—7 of Figure 1.

Movement of an article toward the wrapping station is utilized to control delivery of a wrapper sheet to the station. When conveyor 3 is loaded, each article successively raises and rocks arm 49 clockwise in Figure 5 to rotate shaft 51 and cam 52 thereon (Figures 5 and 7). Cam 52 actuates micro-switches 53 and 54 mounted on frame 1 of the machine. Micro-switch 53 completes a circuit through a solenoid 56 which operates a pin clutch 57. Pin clutch 57 is a well known device in which the solenoid 56 moves wedge 58 to move pin 59 against the bias of a spring (not shown) and away from disc 61 on shaft 28 to disconnect this from disc 62 on shaft 63. While the shaft 28 to which disc 61 is connected is rotated continuously, shaft 63, to which disc 62 is connected, revolves only when micro-switch 53 is actuated to complete the circuit to solenoid 56. Energization of solenoid 56 is effective to withdraw wedge 58 and permit the spring biasing pin 59 to move the pin 59 to engage disc 61 and complete the connection between shafts 28 and 63.

Figure 21:
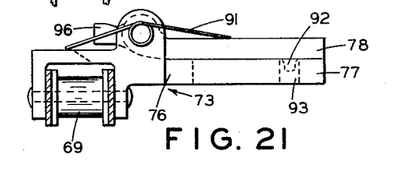
Figure 21 is an elevation of the wrapper-pulling fingers in closed, wrapper-gripping position.
Figure 22:
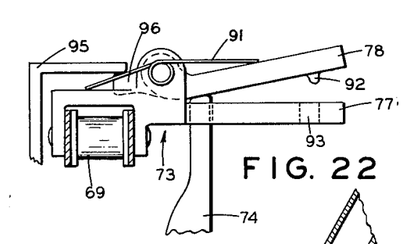
Figure 22 is an elevation of the wrapper-pulling fingers in an open position.

The wrapper sheet is drawn into place by the following mechanism:

Shaft 63 drives shaft 64 through bevel gears 65 while shaft 64 in turn rotates shaft 66 through bevel gears 67. Mounted on shaft 66 are sprockets 68 which carry wrapper feeding chains 69 also trained over sprockets 71 on shaft 72. Attached at equally spaced intervals on chains 69 are wrapper clamps 73 having jaws 77 and 78. As clamps 73 advance toward sprockets 71 (Figure 1), fingers 74 attached to the hubs of sprockets 71 pass through an aperture 76 in lower jaw 77 and move upper jaw 78 about 90°, permitting jaw 77 to move beneath the wrapper sheet (Figures 21 and 22). As clamps 73 leave sprockets 71, fingers 74 are withdrawn and spring 91 forces jaw 78 down on the wrapper sheet and force a tooth 92 to press the wrapper into a hole 93 in jaw 77 (Figure 21) to grip the wrapper sheet firmly. The wrapper sheet is then drawn across plate 94 by clamps 73. The plate 94 is ribbed to prevent the wrapper from sticking when wet (Figure 5).

The wrapper sheet is severed to provide a wrapper of a desired length, the mechanism for this being presently described. When a wrapper sheet covers plate 94, clamps 73 encounter angle plate 95 to rotate tail 96 of jaw 78 and open the clamps, as appears in Figure 22, and release the wrapper sheet just as plunger 97 is caused to descend to engage an article beneath the plunger. As will be presently described, plunger 97 moves downwardly to force an article past supporting flaps 13 in the article carrier by rotating these and through an aperture in plate 94 and cylindrical guide 98, through hole 99 in stapling plate 101, through hole 102 in cam plate 103 and into an open bottom basket 104 wherein the article rests momentarily with the wrapper drawn up around the article with the ends of the wrapper adjacent one another.

The wrapper cut-off

Figure 23:
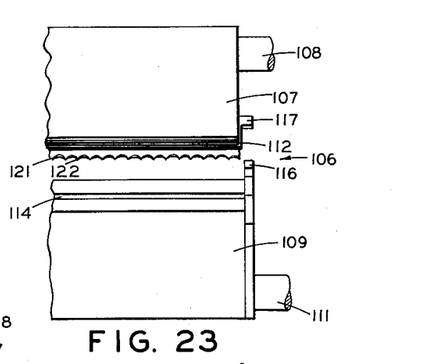
Figure 23 is an elevation of a portion of the knife in position for cutting of the wrapper sheet.
Figure 24:
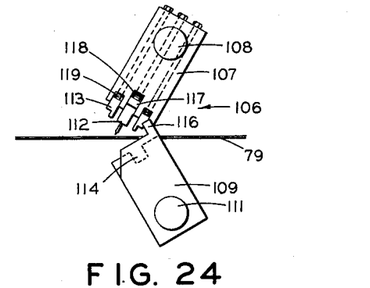
Figure 24 is an end view of the wrapper cutting knife.

Just before plunger 97 descends, the cutting mechanism, generally indicated at 106, cuts off a length of the wrapper 79 sufficient to wrap the article (Figures 23 and 24). Cutter 106 comprises a knife-holding bar 107 revolving on shaft 108 and blade receiving bar 109 revolving on shaft 111. Bar 107 carries knife 112 and paper clamps 113, while bar 108 carries knife receiving slot 114 and boss 116. As bars 108 and 109 approach the cutting position (Figure 24), boss 116 engages lug 117 on knife 112, raising the latter against spring 118 and over the wrapper sheet 79. As bars 108 and 109 approach a vertical position, wrapper 79 is firmly held in place by clamps 113, being forced against bar 109 by springs 119. At the same time, lug 117 slides off boss 116 and knife 112 drops forcefully and rapidly into slot 114 to sever the wrapper 79 as it moves along. Knife blade 121 is serrated as at 122 to puncture tough wrapping materials such as cellophane and facilitate cutting and severance. Shaft 111 is driven from shaft 72 through chain 123 and sprockets 124 while shaft 108 is rotated by shaft 111 through spur gears 126.

The wrapper feed

The wrapper sheet 79 is derived from a roll 127 and is fed at a suitable speed into the wrapping section. The roll of paper 127 is mounted on shaft 128 which rests on rollers 129, shaft 128 being rotated by shaft 141 through spur gears 142. Shaft 141 is rotated by shaft 143 through bevel gears 144, shaft 143 being rotated by shaft 146 through bevel gears 147. Shaft 146 is driven by a variable speed transmission device 148 of a well-known disc type, the variable speed device being driven from shaft 149 which is in turn rotated from shaft 63 through a sprocket and chain drive 151.

In transmission 148, disc 152 on shaft 149 presses against and turns disc 153 (Figure 7) which in turn rotates disc 154 on shaft 146. Disc 153 is mounted on shaft 156 which is journaled in a support 157 slidably mounted on a bar 158. The drive ratio between shafts 149 and 146 is varied by altering the position of disc 152 with respect to discs 153 and 154. This is effected by a screw 159 rotated by motor 161 through gear reducer 162. A calibrated scale 163 indicates the correct position for disc 153 for any given diameter of paper roll so an operator can check the feed at any time and can adjust this as will be presently described.

The wrapper sheet 79 passes under idler 164 and over idler 166 and plate 167. Idler 164 is journaled in arms 168 which rotate on shaft 169 while idler 164 is counterbalanced by weights 171. If the machine requires more wrapper than is released off roll 127 at the setting of the variable speed transmission 148, the increased tension in paper 79 raises idler 164, turning shaft 169 and cam 172 mounted thereon. Cam 172 actuates micro-switches 173 and 174 to complete a circuit through each of these. Switch 173 controls motor 161 when idle 164 is above or below the normal operating position while switch 174 reverses the direction of rotation of motor 161. If idler 164 is too high, indicating the need of a faster feed rate, motor 161 runs in the direction to make transmission 148 increase the speed of shaft 146 while if idler 164 is too low, indicating a need for a slower feed rate, micro-switch 174 reverses the direction of motor 161.

*The plunger*

Plunger 97 is mounted on rod 176 and is movable up and down in a vertical path through guides 177 and 178 (Figure 5) in a suitable timed relationship. Rod 176 is actuated by arm 179 which rocks about pin 181. One end 182 or arm 179 rides in a slot in rod 176 while pin 183 on the other end of arm 179 rides in a cam track 184 on a revolving cam cylinder 186 mounted on shaft 64 to raise and lower the plunger.

*Placement of wrapper ends*

Figure 8:
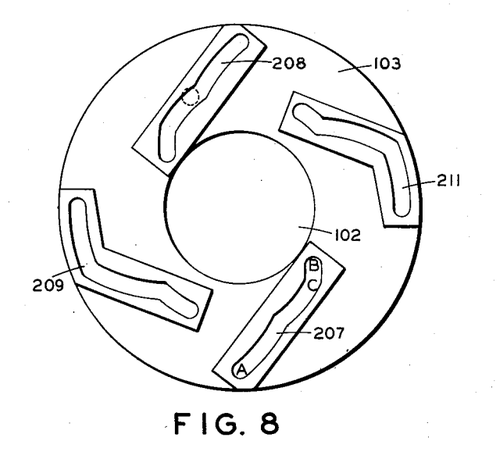
Figure 8 is a plan view of the cam plate which operates the crimping jaws.
Figure 9:
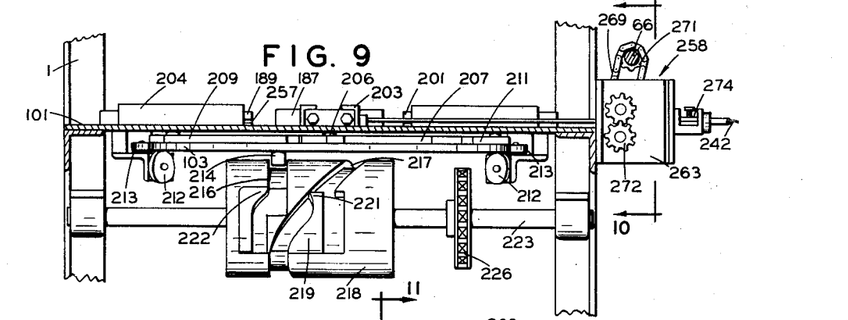
Figure 9 is a partial section along lines 9—9 of Figure 5.
Figure 10:
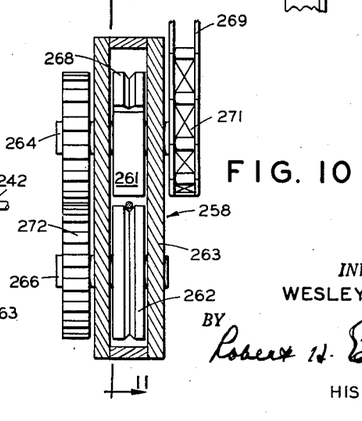
Figure 10 is a section along lines 10—10 of Figure 9.

When plunger 97 has reached the bottom of its stroke, the article rests in a basket-like structure provided by a plurality of radially arranged supporting fingers 184 with a sheet of the wrapper about its bottom and extending loosely upward with the wrapper edges in guide 98 (Figures 5, 16, 17 and 18). Jaws 187, 188, 189 and 201 are moved toward one another to crimp the wrapper ends above the article into a small square indicated at 202 (Figure 18) in which the wrapper ends are ready for sealing or fastening. Jaws 187 and 188 slide on plate 101 between guides 203 while jaws 189 and 201 slide in guides 204. Jaw 187 is actuated by pin 206 sliding in cam track 207 on revolving cam plate 103 while like pins on jaws 188, 189 and 201 each ride in tracks 208, 209 and 211, respectively, as appears in Figure 8. Tracks 207 and 208 are similar to one another while track 209 is similar to track 211. Cam plate 103 rides on four vertical rollers 212 and is guided by four horizontal rollers 213 (Figure 9).

The rotation of plate 103 is selectively controlled by pin 214 which moves alternately over cam tracks 216 and 217 on double cam track cylinder 218. Cylinder 218 is mounted on shaft 223 and is driven from drive shaft 63 by chain 224 and sprockets 226. A slidable switch plate 219 (Figure 9) selectively permits pin 214 to travel over track 216 for one revolution and then over track 217 for the next revolution of cylinder 218. When pin 214 enters track 217 it strikes projection 221 on switch 219 causing switch 219 to slide to the right in Figure 9 to leave track 216 open to receive pin 214. When pin 214 enters track 216, it strikes projection 222 on switch 219, pushing switch 219 to the left and opening track 217. When pin 214 moves through track 216, plate 103 remains stationary but when pin 214 moves in track 217, plate 103 revolves until pin 206 moves from A to B in track 207 (Figure 8). At the same time, the pins in tracks 208, 209 and 211 move in toward hole 102 and jaws 187, 188, 189 and 201 are moved into abutment. When pin 214 is returned to track 216, the several pins and pin 206 are moved back to A.

*Stapling of the wrapper*

Figure 12:
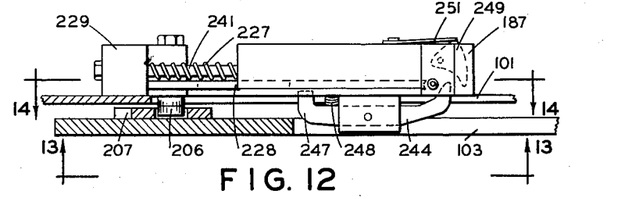
Figure 12 is a side elevation of the crimping jaw for forming the locking member.
Figure 13:
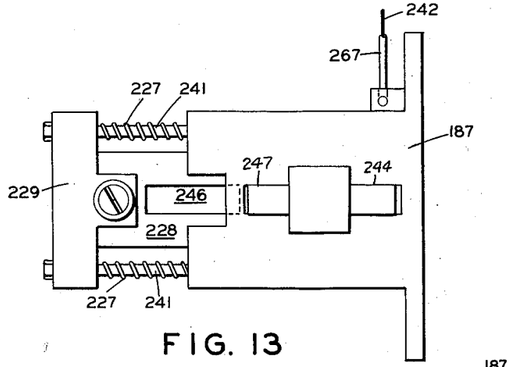
Figure 13 is a view along lines 13—13 of Figure 12.
Figure 14:
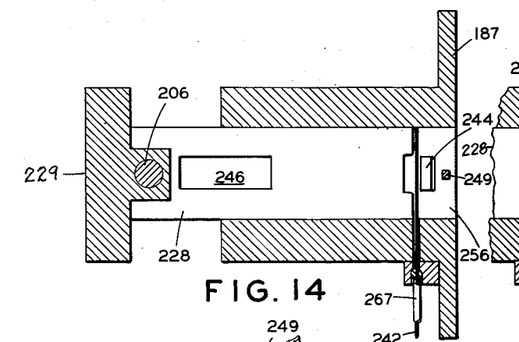
Figure 14 is a section along lines 14—14 of Figure 12.
Figure 15:
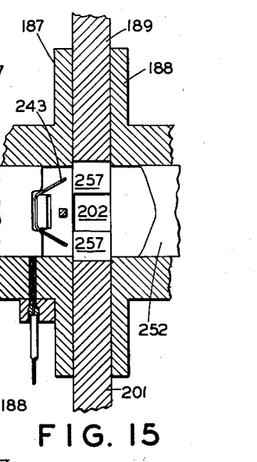
Figure 15 is a section comparable to that of Figure 14 but with the jaws in closed position showing formation of the locking member.
Figure 16:
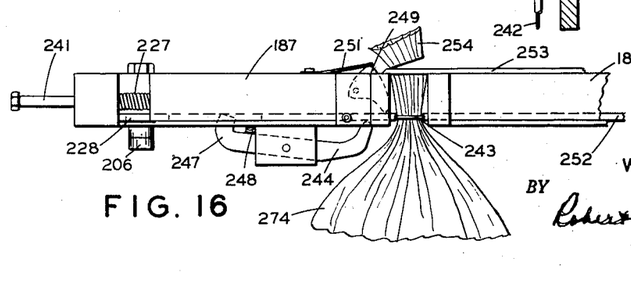
Figure 16 is a view similar to Figure 12 but with jaws closed and the wrapped package in position.
Figure 17:
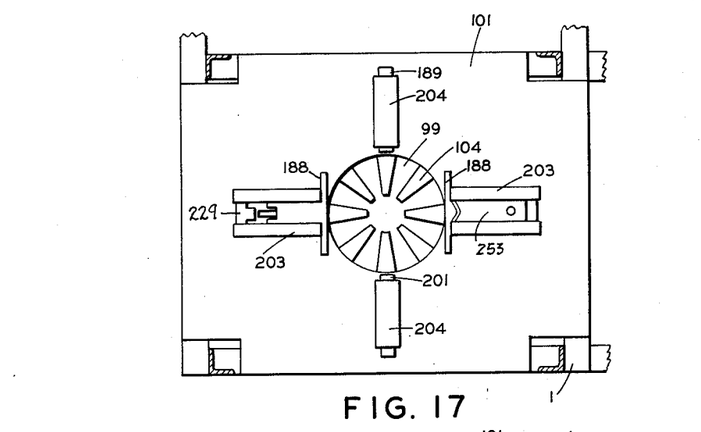
Figure 17 is a plan view of the crimping jaws in open position.
Figure 18:
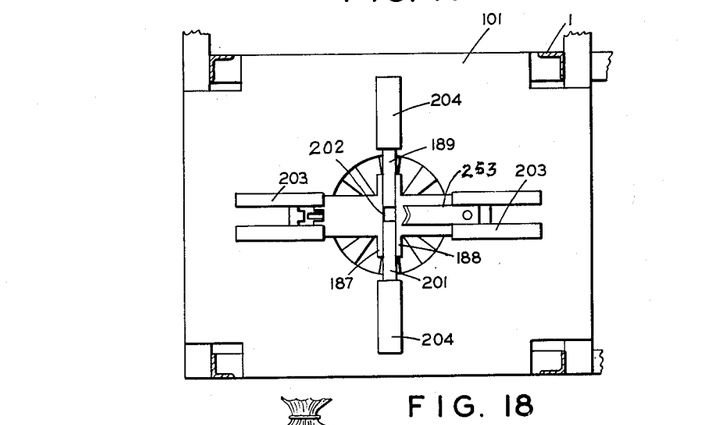
Figure 18 is a plan view similar to that in Figure 17 but with the jaws closed.

To secure the wrapper ends together any suitable means can be utilized; the ends can be heat sealed, tied with string or secured with a wire staple which I prefer. To effect this, jaw 187 includes a jaw proper and a stapling or staple forming mechanism provided by stapling plate 228 carried on a heel plate 229. The stapling plate and the heel plate are slidably supported on the jaw 187 by rods 241 and are biased away from staple forming position by springs 227. Pin 206 is carried on the heel piece 229 and moves the jaw positively until the jaw abuts the other jaw members, i. e., when pin 206 reaches position C in track 207, jaw 187 can move no further, being against jaws 189 and 201 (Figure 15). However, pin 206 continues to move and springs 227 are compressed as stapling plate 228 is moved slidably through jaw 187 and heel piece 229 slides along rods 241 (Figure 16). As the plate 228 is moved in, it cuts off a length of wire 242 fed, as will be described, from reel 259 and simultaneously forming a staple 243 about rocker 244 which is held in staple forming position until hole 246 in plate 228 is in position to admit tail 247 of rocker 244 (Figure 12). Plate 228 pushes rocker 244 down and compresses spring 248 while trigger 249 is pushed up against spring 251. The bent wire staple 243 so formed surrounds the wrapper ends on three sides. The staple is closed, being bent around the fourth side of the wrapper ends by anvil plate 252 which has the same motion as plate 228.

Moving with plate 252 above jaw 188 is knife blade 253 which cuts off the surplus top portion 254 of the wrapper above the staple. As jaws 187, 188, 189 and 201 open to receive the next article, trigger 249 is pushed down to prevent defective staples from entering recess 256. Notches 257 in the sides of jaws 189 and 201 (Figures 9 and 15) permit the passage of staple 243 and plates 228 and 252.

*Wire feed*

Figure 11:
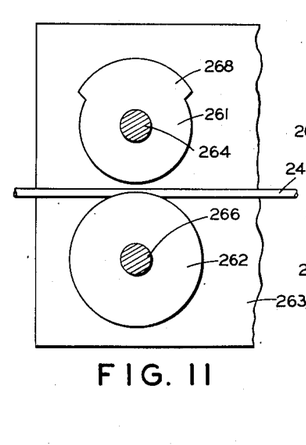
Figure 11 is a section along lines 11—11 of Figure 10.

Wire 242 is fed from reel 259 across jaw 187 and in front of stapler plate 228 by a positive feeder indicated generally at 258 under the tension of screw clamp 274 which controls the tension in wire 242. Feeder 258 contains partially grooved wheel 261 and grooved wheel 262 mounted in housing 263 and revolving on pins 264 and 266, respectively (Figure 11). Wire is fed through tube 267 only when grooved portion 268 of wheel 261 is in contact with wire 242, wheel 261 being driven from shaft 66 through chain 269 and sprockets 271. Wheel 262 is driven by wheel 261 through spur gears 272.

*Removal of wrapped articles*

Figure 19:
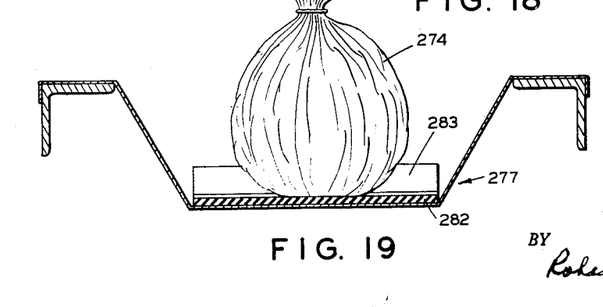
Figure 19 is a section through the discharge conveyor.
Figure 20:
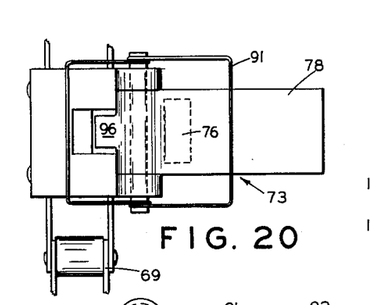
Figure 20 is a plan of the wrapper-pulling fingers.

After an article is wrapped, stapled and trimmed, the next article is shoved down on top of it forcing the wrapped article 274 through basket 104 into chute 276 onto trough conveyor 277 driven by gear motor 278 through belt 279 and sheaves 281. Conveyor belt 282 contains rubber T sections 283 to move wrapped articles away (Figure 19).

*Wrapping of bulk articles*

Figure 25:
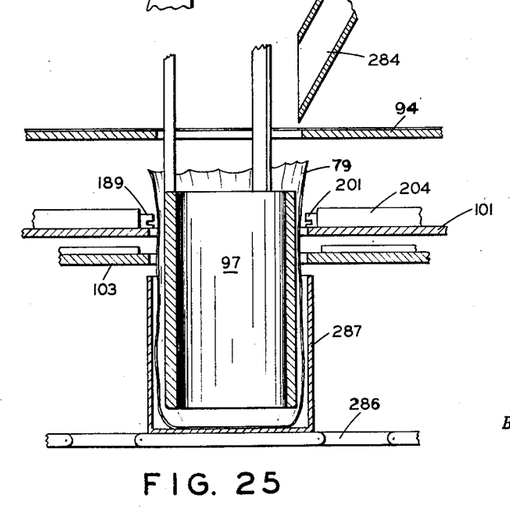
Figure 25 is a section through a modified design for packaging bulk materials such as peas, beans and like bulk articles.

In Figure 25, I have illustrated a modification of the device in which plunger 97 is hollow and measured amounts of bulk materials as peas and the like are fed from pipe 284 through plunger 97 onto wrapper 79 after the plunger 97 has forced the wrapper into place. Conveyor 286 with containers 287 is substituted for basket 104 and conveyor 277. Containers 287 may be permanently fixed to conveyor 286 merely to give form to the wrapper 79 while being filled or it may be part of the package.

In this form, the plunger, the wrapper placing mechanism and the bulk article delivery operate sequentially, that is, the wrapper is placed, the hollow plunger descends to force the wrapper into place and give it form whereupon the bulk articles are discharged. The plunger is then withdrawn, the bulk articles taking its place. The ends of the wrapper are then gathered and stapled.

*Operation*

In operation, the conveyor 3 is advanced stepwise toward the wrapping station, each article on the conveyor in turn rocking arm 49 and so completing the circuits through switches 53 and 54. Before plunger 97 is caused to descend, a wrapper sheet is drawn into position and severed from the bulk roll supply. If any carrier 4 lacks an article, the actuation of the wrapper feed and of the plunger is omitted because arm 49 is not rocked. When the plunger 97 descends it forces the article onto the wrapper and then forces the two through the aperture in plate 94, through cylindrical guide 98, through hole 99 in stapling plate 101, through hole 102 in the cam plate 103 and into the support basket 104. When the loosely wrapped article rests in the basket, the ends of the wrapper are about the article. Jaws 187, 188, 189 and 201 then are actuated to gather and compress the loose wrapper ends until the article is tightly wrapped. The compressed wrapper end is then stapled and cut off. The wrapped article remains in the basket until plunger 97 forces another loosely wrapped article into the basket to displace the wrapped and stapled article resting in the basket.

I claim:

1. In a machine of the character described, means for supporting a wrapper sheet in position about an article therein with the ends of the wrapper extending upwardly, a plurality of radially positioned jaws adapted to be moved toward and away from each other to force together said wrapper ends, means for moving said jaws toward and away from one another, and means carried by one of said jaws for stapling the gathered ends of the wrapper while said ends are forced together by said jaws.

2. In a machine of the character described, means for supporting a wrapper sheet in position about an article therein with the ends of the wrapper extending upwardly, a plurality of radially positioned jaws adapted to be moved toward and away from each other to force together said wrapper ends, means for moving said jaws toward and away from one another, means carried by one of said jaws for stapling the gathered ends of the wrapper while said ends are forced together by said jaws, and means carried by one of said jaws for trimming the unstapled ends of the wrapper above the staple.

3. In a machine of the character described, a flexible basket for supporting a wrapper sheet in position about an article therein with the ends of the wrapper extending upwardly, a plurality of radially positioned jaws adapted to be moved toward and away from each other to force together said wrapper ends, means for moving said jaws toward and away from one another, means for stapling the gathered ends of the wrapper while said ends are forced together by said jaws, and a plunger for forcing a second article on a wrapper down onto a wrapped, stapled article in said basket to displace said wrapped article and position said second article and wrapper for stapling.

4. In a machine of the character described, means for supporting a wrapper sheet in position about an article therein with the ends of the wrapper extending upwardly, a plurality of radially positioned jaws adapted to be moved toward and away from each other to force together said wrapper ends, means for moving said jaws toward and away from one another, and means carried by one of said jaws for stapling the gathered ends of the wrapper while said ends are forced together by said jaws including wire feeding means for feeding in a length of wire across one of said jaws, a staple forming plate movable with respect to said jaw to cut off a length of wire and force said length about a staple forming mechanism to bend the wire into a U shape and thence on about the compressed gathered wrapper ends and into abutment with another of said jaws to close said staple.

WESLEY DODGE.

REFERENCES CITED

The following references are of record in the file of this patent:

UNITED STATES PATENTS

| Number | Name | Date |
|---|---|---|
| 1,162,611 | Jones | Nov. 30, 1915 |
| 1,226,168 | Barber | May 15, 1917 |
| 1,635,035 | Dickinson | July 5, 1927 |
| 1,726,929 | Slocomb et al. | Sept. 3, 1929 |
| 2,009,241 | Roberts | July 23, 1935 |
| 2,179,024 | Slocum | Nov. 7, 1939 |